Figures 1, 2:
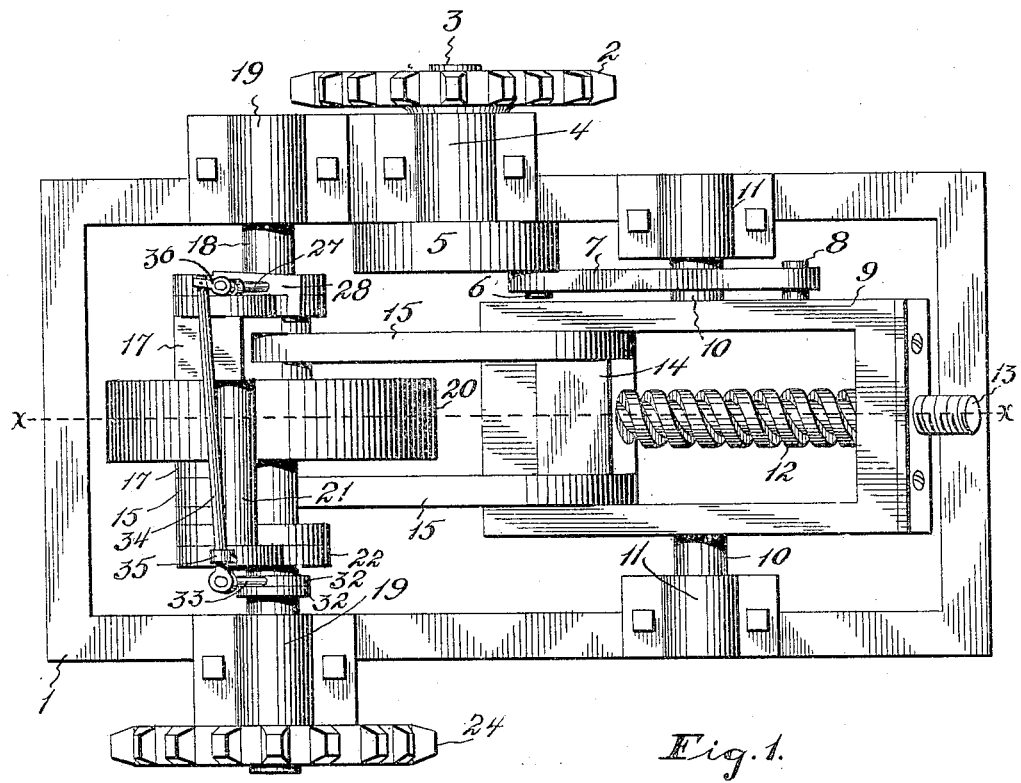

No. 838,600. PATENTED DEC. 18, 1906.
H. E. WHITE.
POWER TRANSMISSION DEVICE.
APPLICATION FILED JAN. 22, 1906.

2 SHEETS—SHEET 1.

WITNESSES
Carl Stoughton

INVENTOR
Harland E. White
BY
ATTORNEYS

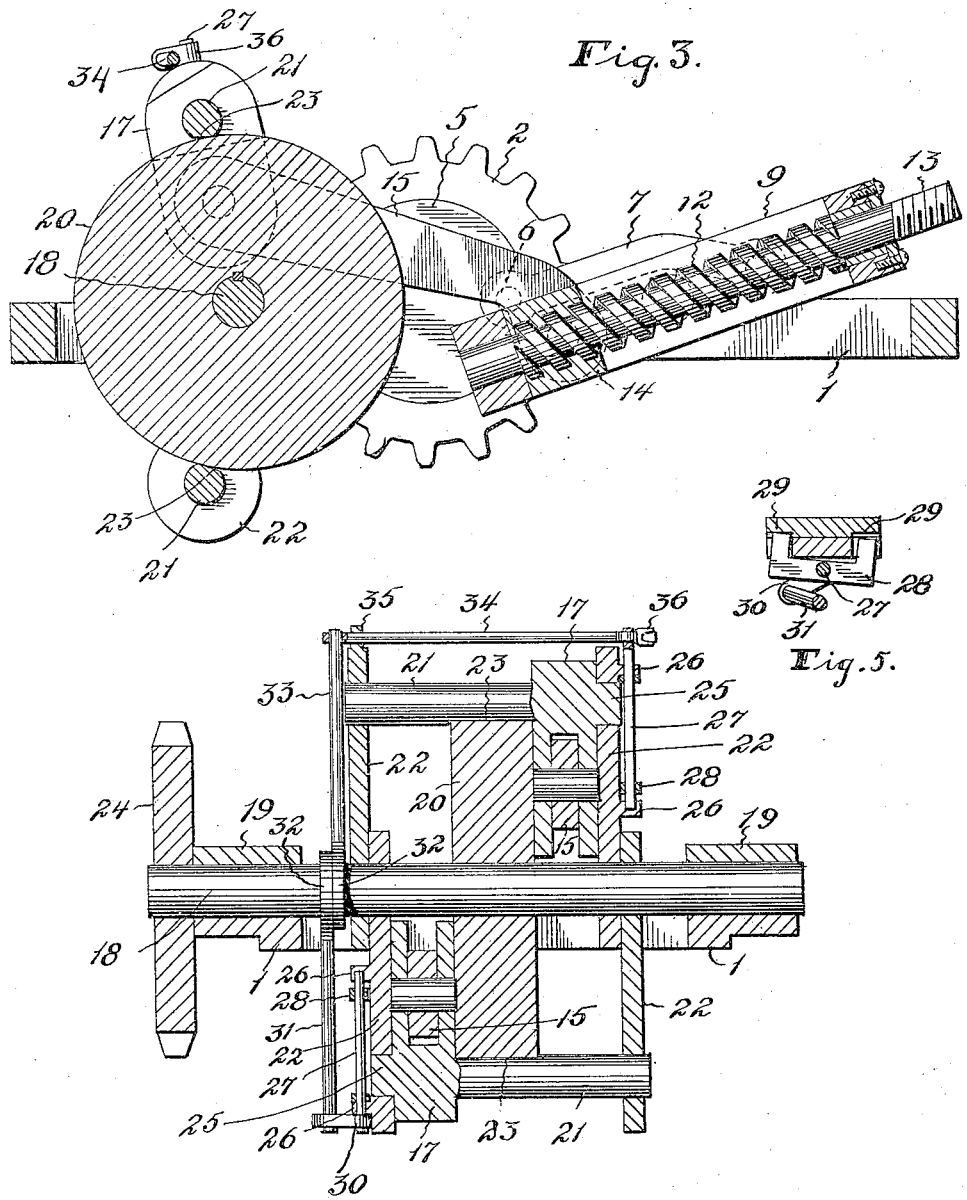

UNITED STATES PATENT OFFICE.

HARLAND E. WHITE, OF COLUMBUS, OHIO, ASSIGNOR OF ONE-HALF TO FREDERICK L. WOODBRIDGE, OF NEWARK, OHIO.

POWER-TRANSMISSION DEVICE.

No. 838,600.    Specification of Letters Patent.    Patented Dec. 18, 1906.

Application filed January 22, 1906. Serial No. 297,152.

*To all whom it may concern:*

Be it known that I, HARLAND E. WHITE, a citizen of the United States, residing at Columbus, in the county of Franklin and State of Ohio, have invented certain new and useful Improvements in Power-Transmission Devices, of which the following is a specification.

My inventon relates to new and useful improvement in power-transmission devices.

The object of the invention is to provide a transmission in which the use of gears is obviated, thus producing a device which in its operation is practically noiseless and the liability of stripping teeth, thereby throwing the device out of operative condition, is overcome.

Still another feature resides in regulating means whereby the transmission of power may be controlled.

Finally, the object of the invention is to provide a device of the character described that will be strong, durable, and efficient, simple of construction, and not liable to get out of working order.

With the above and other objects in view the invention consists of the novel details of construction and operation, a preferable embodiment of which is described in the specification and illustrated in the accompanying drawings, wherein—

Figure 1 is a plan view of my improved transmission device. Fig. 2 is a side elevation of the same. Fig. 3 is a longitudinal vertical sectional view taken on the line $x$ $x$ of Fig. 1. Fig. 4 is a transverse vertical sectional view taken on the line $y$ $y$ of Fig. 2; and Fig. 5 is a detail horizontal sectional view taken on the line $a$ $a$ of Fig. 2, showing one of the reversing-yokes and its parts.

In the drawings the numeral 1 designates an open rectangular frame. On one side of the frame and near the center thereof I arrange a sprocket-wheel 2, which is suitably connected with an engine or other source of power generation. This sprocket is fixed upon a shaft 3 and the latter mounted in a suitable bearing 4, secured upon the frame. The inner end of the bearing terminates substantially flush with the inner side of the frame, so as to permit a disk 5, made fast to the shaft 3, to revolve in close proximity to the frame. This disk is provided with a wrist-pin 6, set to one side of its center and pivotally connected to the end of an offset link 7, the latter being best shown in Figs. 1 and 2. At its opposite end the link has pivotal engagement with a pin 8, projecting from the side of a swinging frame 9. This frame at its central portion is provided with trunnions 10, which are mounted in suitable bearings 11, supported on the upper side of the frame on the opposite side of its center from the bearing 4. The link 7 passes over and beyond one of the trunnions 10, so that it has connection with the swinging frame beyond the center of the latter with respect to the disk 5 and the wrist-pin 6. It will thus be apparent that motion being transmitted to the disk 5 by way of the sprocket 2 and the shaft 3 the wrist-pin will swing or rock the frame 9 on its trunnions 10 through the agency of the link 7 and the pin 8.

The frame 9 is disposed at an angle to the frame 1 and has its end adjacent the disk 5 lowermost, as clearly shown in Figs. 2 and 3. Centrally and longitudinally of the frame 9 a quick-screw 12 is disposed and while free to turn is held against longitudinal movement. One end of the screw 13 projects beyond the upper end of the frame 9 to afford connection with a suitable controlling means. (Not shown.) On the screw and within the frame a block-nut 14 is disposed. The threads of the screw 12 have considerable pitch, and thus by giving a slight rotation to the screw the block is caused to quickly travel thereon. The block has a length considerably shorter than the width of the open portion of the frame, so as to receive on each side links 15, the latter fitting snugly between the ends of the block and the frame and having pivotal connection with trunnions 16, projecting from the block and shown in Figs. 1 and 2. The links 15 are bent upwardly and extended one upward and the other downward, as indicated in Fig. 2. At their free ends they are pivotally connected in the bifurcated portion of clutch-arms 17. The clutch-arms are separated by and stand on each side of a friction disk or wheel 20, fixed upon a shaft 18, mounted in bearings 19 and adapted to turn or revolve the same. These clutch-arms standing on opposite sides of the wheel 20 and one projecting upwardly and the other downwardly are provided with horizontally and transversely extending cylindrical bars 21 and pivot-studs 25. The bars and studs project in opposite directions and are supported at their free ends by arms 22, mounted upon the shaft 18. These bars are preferably formed integral with the clutch-arms and provided with a flattened portion 23, adjacent the periphery of the wheel 20, and it is to be noted that the said flattened portions or surfaces are inclined, so as to bring one edge into contact with the periphery of the wheel and also with relation to Fig. 3, that the flat portion 23 of the upper bar has its right-hand edge in engagement with the periphery of the wheel, while the lower bar has its left-hand edge in engagement with said periphery. In this way when the lower end of the frame 9 is swung downward the clutch-arms 17 will be swung toward the frame by the links 15 and the edge of the upper flat portion 23 caused to bite in the periphery of the wheel 20 and turn the same in the direction in which the clutch-arms are swung. Owing to the disposition of the edge of the lower flat portion, the same will merely slide over the periphery of the wheel without imparting motion thereto. During this movement the disk 5 has completed a half-revolution and swung the frame 9 to its lowermost position. During the next half-revolution of the disk 5 the frame 9 will be swung upward and the clutch-arms 17 swung back to their starting-points. During this backward movement the flat portion 23 of the upper bar will slide over the periphery of the disk, while the edge of the flat portion of the lower bar will bite in the periphery and impart motion to the wheel in the same direction as before. A practically continuous revolution is thus imparted to the wheel 20 and the shaft 18, and the motion thus imparted is transmitted to a sprocket 24, mounted on the end of the shaft 18. This sprocket may be suitably connected to the machine or device which is to be driven by the transmission.

When the block 14 is in its lowermost position, or its greatest distance from the trunnions 10 of the frame 9, the longest stroke will be imparted to the clutch-arms 17; but it is apparent that by turning the screw 12 so as to cause the block to travel up the screw the stroke is shortened. The transmission is thus under perfect control of the operator, and when the block 14 arrives exactly opposite the trunnions 10 or in the center of the frame 9 no motion will be imparted to the clutch-arms 17 and the frame 9 merely swung, thus permitting the shaft 18 and the sprocket 24 to rest without stopping the engine or motor to which the driving-sprocket 2 is connected.

It will be apparent that the clutch-arms and the cylindrical bars 21 are capable of a slight swinging or rocking movement, and by controlling this rocking movement the direction of revolution of the disk wheel 20 may be governed and in this way the transmission reversed. In carrying out these functions I provide on each of the arms 22 adjacent the clutch-arms 17 supporting-lugs 26, in which rocking rods 27, extending longitudinally of the arms, are mounted. Made fast on each of these rods is a yoke 28, and in the arm adjacent the free ends of the yoke recesses 29 are formed. The yokes are disposed so that one end rests in one of the recesses and the other stands out of the other recess. When the rocking rod 27 is rocked, the yoke is swung so as to change the relation of its ends and the recesses. For swinging the yokes I provide on the lower end of the rod 27, attached to the yoke of the lower clutch-arm, a crank-arm 30, which projects at an angle and is engaged to the upper end of a clutch-rod 31, the latter having a collar 32 fitting loosely about the shaft 18. Extending upwardly and oppositely from the clutch-rod 31 is a second clutch-rod 33, also formed with a collar 32. This rod 33 engages at its upper end in the end of a connecting-rod 34, supported in an ear 35 in the upper end of one of the arms 22. This connecting-rod passes across and has pivotal engagement with a crank-arm 36, mounted on the upper end of the uppermost rocking rod 27. By moving the ring portions 32 laterally on the shaft 18 it is apparent that the rods 27 will be rocked and the opposite ends of the yokes thrown into and out of the recesses 29. It will be noted that the yokes are disposed so that when one end or leg of one yoke is in engagement with one of the recesses 29 of one of the clutch-arms 17 the opposite end or leg of the other yoke is in engagement with the opposite recess of the other clutch-arm 17. By this disposition the flat portions 23 of the bars 21 are disposed as shown in Fig. 3, and thus the wheel 20 is caused to revolve with relation to Fig. 3 to the right. When it is desired to impart a reverse movement to the wheel 20, it is merely necessary to swing the yokes 28 so that their opposite ends engage in the notches 29. This causes the bars 21 to be rocked so that the flat portions occupy reversed positions, or, in other words, still referring to the said figure, the flat portion 23 of the lower bar 21 assumes the position of the flat portion 23 of the upper bar and the flat portion of the upper bar assumes the position of the flat portion of the lower bar. Thereby as the frame 9 is swung downward the upper clutch-arm merely slides over the periphery, while the lower clutch-arm through the flattened portion 23 imparts motion to the friction-disk.

Attention is called to the fact that the direction of revolution of the sprocket 24, shaft 18, and disk wheel 20 may be readily and easily reversed without undue strain on the parts. It is also pointed out that by means of the screw 12 and the traveling nut-block 14 the speed of the transmission may be gradually increased or diminished, and thus a transmission of this character has no limitation as to the set number or character of speeds. I have found that my transmission when attached to a motor-vehicle greatly improves the same and maintains the vehicle at all times under perfect control of the operator. Also the usual gear troubles, such as noise and the stripping of teeth, are avoided.

What I claim is—

1. The combination with a driven member, of an oscillatory frame, connections between said driven member and said oscillatory frame for imparting motion to said oscillatory frame from said driven member, a screw journaled in said oscillatory frame, a nut engaging said screw, a rotative member, links connected to the nut, and members to which said links are connected which are adapted to engage the outer periphery of the rotative member to impart rotation thereto.

2. The combination with an open rectangular frame, of a rocking frame journaled in said open rectangular frame upon fixed pivots, a driven member, connections between said driven member and said rocking frame, a screw journaled in the rocking frame, a nut which said screw engages, said screw being adapted when turned to cause the nut to travel longitudinally of the rocking frame, links connected to said nut, a rotative member, and members connected to said links adapted to engage the outer periphery of the rotative member to impart motion thereto in either direction:

In testimony whereof I affix my signature in presence of two witnesses.

HARLAND E. WHITE.

Witnesses:
A. L. PHELPS,
M. B. SCHLEY.